(12) United States Patent
Rieder et al.

(10) Patent No.: US 7,325,862 B2
(45) Date of Patent: Feb. 5, 2008

(54) MOTOR VEHICLE DOOR WITH A LATERAL IMPACT PROTECTION DEVICE

(75) Inventors: Klaus Rieder, Weissach-Flacht (DE); Mathias Fröschle, Ostfildern (DE)

(73) Assignee: Dr. Ing. h.c. F. Porsche AG, Stuttgart (DE)

( * ) Notice: Subject to any disclaimer, the term of this patent is extended or adjusted under 35 U.S.C. 154(b) by 0 days.

(21) Appl. No.: 11/645,831

(22) Filed: Dec. 26, 2006

(65) Prior Publication Data

US 2007/0145772 A1    Jun. 28, 2007

(30) Foreign Application Priority Data

Dec. 24, 2005   (DE)   ..................... 10 2005 062 299

(51) Int. Cl.
*B60J 5/00* (2006.01)
(52) U.S. Cl. .............................. 296/187.12; 296/146.6
(58) Field of Classification Search ........... 296/187.12, 296/146.6
See application file for complete search history.

(56) References Cited

U.S. PATENT DOCUMENTS 6,976,728 B2 * 12/2005 Froeschle et al. ........ 296/146.6

FOREIGN PATENT DOCUMENTS

| DE | 92 18 388.3 | 4/1994 |
| DE | 103 20 971 B3 | 9/2004 |

* cited by examiner

Primary Examiner—Joseph D. Pape

(57) ABSTRACT

A motor vehicle door has a lateral impact protection device with a lateral impact beam and a fastening device to connect the lateral impact beam to a door part. The fastening device has a fastening bracket being a cast part and is connected to the door part. The fastening bracket has a fork-shaped seat for receiving the lateral impact beam. A holding bolt passes through the lateral impact beam and the fork-shaped seat. The fork-shaped seat contains at least two inner surfaces which face the lateral impact beam and lie opposite one another with a spacing and a fork bottom. For ease of production, the fork-shaped seat widens with its inner surfaces in its direction pointing away from the fork bottom. The inner surfaces are configured as unfinished cast surfaces, and the lateral impact beam has a trapezoidal cross section adapted to the widening seat.

7 Claims, 3 Drawing Sheets

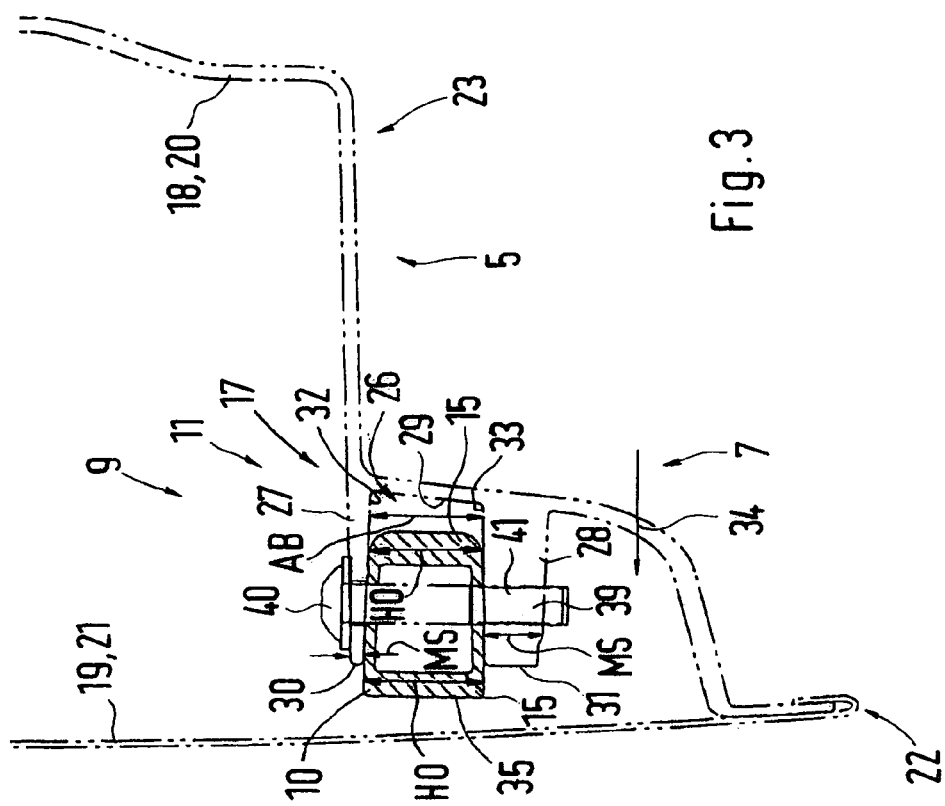
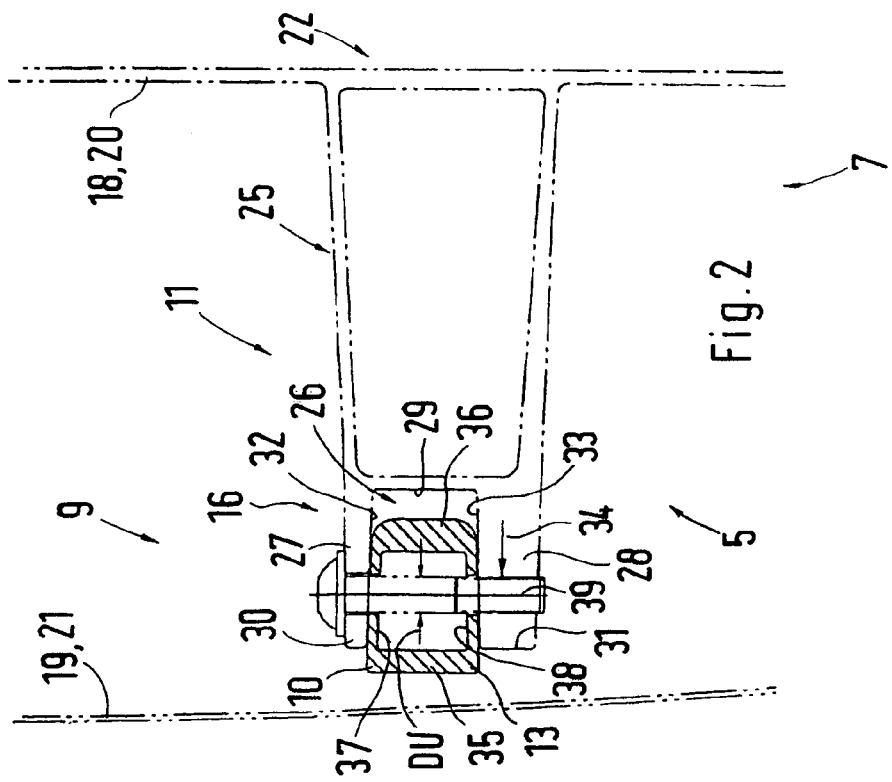

MOTOR VEHICLE DOOR WITH A LATERAL IMPACT PROTECTION DEVICE

CROSS-REFERENCE TO RELATED APPLICATION

This application claims the priority, under 35 U.S.C. §119, of German application DE 10 2005 062 299.2, filed Dec. 24, 2005; the prior application is herewith incorporated by reference in its entirety.

BACKGROUND OF THE INVENTION

Field of the Invention

The invention relates to a motor vehicle door with a lateral impact protection device.

A generic motor vehicle door is known from German patent DE 103 20 971 B3, corresponding to U.S. Pat. No. 6,976,728. This motor vehicle door is equipped with a lateral impact protection device, which is disposed inside the motor vehicle door parallel to the vehicle longitudinal axis. The lateral impact protection device contains a lateral impact beam and a fastening device with which the lateral impact beam can be connected to a door part of the motor vehicle door. The fastening device has a fastening bracket, which is made in the form of a light metal cast part and is connected to the door part. The fastening bracket has a fork-shaped seat, into which the lateral impact beam is inserted. The fork-shaped seat and the lateral impact beam are passed through by a holding bolt, by which the lateral impact beam is fixed to the seat. The fork-shaped seat also has two inner surfaces which face the lateral impact beam and lie opposite one another with a spacing and also a fork bottom, so that the seat is approximately U-shaped. In the known motor vehicle door, the inner surfaces lying opposite one another run parallel to one another. Accordingly, the lateral impact beam is box-shaped or rectangular in cross section.

A lateral impact beam for a motor vehicle door which has a trapezoidal cross section is described in German Utility Model DE 92 18 388 U1. However, the fastening of the lateral impact beam to the motor vehicle door is not shown therein.

SUMMARY OF THE INVENTION

It is accordingly an object of the invention to provide a motor vehicle door with a lateral impact protection device which overcomes the above-mentioned disadvantages of the prior art devices of this general type, in which the fastening device can be produced simply and economically.

With the foregoing and other objects in view there is provided, in accordance with the invention, a motor vehicle door. The door contains a door part and a lateral impact protection device having a lateral impact beam and a fastening device for connecting the lateral impact beam to the door part. The fastening device has at least one fastening bracket being a cast part and connected to the door part. The fastening bracket has a fork-shaped seat for receiving the lateral impact beam. The lateral impact protection device further has a holding bolt passing through the lateral impact beam and the fork-shaped seat. The fork-shaped seat has at least two inner surfaces facing the lateral impact beam and lying opposite one another with a spacing and a fork bottom. The spacing between the inner surfaces increases in a direction pointing away from the fork bottom defining a widening seat. The inner surfaces are unfinished cast surfaces, and the lateral impact beam has a trapezoidal cross section adapted to the widening seat.

The advantages mainly achieved with the invention can be seen in that the fastening bracket, which is made in the form of a cast part, can be removed easily from its casting mold as the fork-shaped seat widens in its direction pointing away from the fork bottom. A core of the casting mold can consequently be removed easily from the fork-shaped seat. However, the simple production of the fastening device also results from the fact that the inner surfaces of the fork-shaped seat are in the form of unfinished cast surfaces. In this application, unfinished inner surfaces or cast surfaces are surfaces on the cast part which have not undergone machining. The unfinished cast surfaces result in the advantage that the notch effect is reduced in the fork-shaped seat, such a notch effect being brought about in many cases by sharp, metal-cutting tools by virtue of the fact that sharp-edged corner regions or incisions are formed in the cast skin. It has also emerged as particularly advantageous that the lateral impact beam can with its cross section fitting into the fork-shaped seat offer optimized lateral impact protection in relation to the rectangular or box-shaped profiles known from the prior art.

According to a development of the invention, it is advantageous that rattling noises caused by a loose lateral impact beam can be avoided during operation of the motor vehicle by virtue of the play-free holding of the lateral impact beam inside the fork-shaped seat.

In a particularly preferred illustrative embodiment, it is advantageous that the fork web with a reduced material thickness in relation to the other fork web can be applied against the lateral impact beam, by virtue of which the play-free holding of the lateral impact beam in the seat mentioned in the introduction can advantageously be achieved as the thinner of the two fork webs can be applied in the direction of the lateral impact beam. This development is particularly advantageous when, according to a preferred embodiment, the holding bolt is formed by a screw with a screw head.

According to a variant embodiment, the holding bolt is advantageously fixed in only the fork web which has the greater material thickness. The other fork web is only extended through freely by the holding bolt.

According to an illustrative embodiment, it is advantageous that the entire door inner part can be removed easily from the casting mold with the fork-shaped seat.

A development of the invention has the advantage that the lateral impact beam can be inserted easily into the door inner part if the outer panel has not yet been connected to the door inner part.

Other features which are considered as characteristic for the invention are set forth in the appended claims.

Although the invention is illustrated and described herein as embodied in a motor vehicle door with a lateral impact protection device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 2 is a diagrammatic, sectional view take along the line II-II shown in FIG. 1;

FIG. 3 is a diagrammatic, sectional view taken along the line III-III shown in FIG. 1.

DESCRIPTION OF THE PREFERRED EMBODIMENTS

Figure 1:
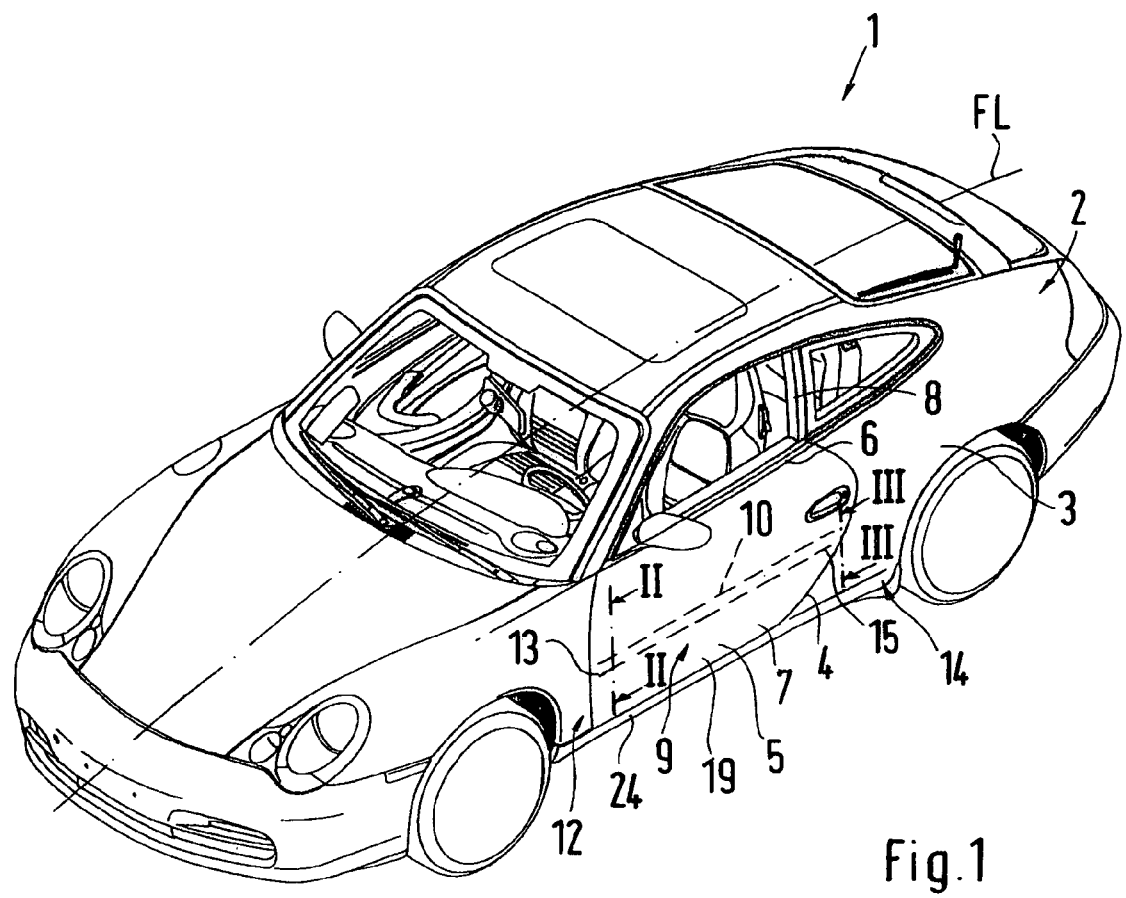
FIG. 1 is a diagrammatic, perspective view of a motor vehicle with a motor vehicle door according to the invention.

Referring now to the figures of the drawing in detail and first, particularly, to FIG. 1 thereof, there is shown a motor vehicle 1, which has a body 2 with a side wall 3, in which a door cutout 4 is provided, into which a motor vehicle door 5 is movably inserted. The motor vehicle door 5, which is referred to simply as the door 5 below, has below a waist 6 a hollow door body 7, into which a window pane 8, which is present above the waist 6 in its closed position, can be moved into a non-illustrated lowered position.

A lateral impact protection device 9, which contains a lateral impact beam 10 running approximately parallel to a vehicle longitudinal axis FL and a fastening device 11 illustrated in FIGS. 2 and 3 via which the lateral impact beam 10 is connected to the door body 7, is also incorporated firmly into the door body 7. The lateral impact beam 10 has a front end portion 13 lying adjacent to an A pillar 12 and a rear end portion 15 lying adjacent to a B pillar 14. The front and rear end portions 13 and 15 of the lateral impact beam 10 are connected to the door body 7 via the fastening device 11.

A front fastening bracket 16 of the fastening device 11 is illustrated in a sectional illustration through the door body 7 in FIG. 2. A rear fastening bracket 17 of the fastening device 11 can be seen in FIG. 3. The lateral impact beam 10 therefore extends between the two fastening brackets 16 and 17. The door body 7 of the door 5 preferably is formed of at least two door parts 18 and 19, of which the door part 18 is in the form of what is known as a door inner part 20 and the door part 19 is formed by an outer panel 21, which is connected to the door inner part 20 in an edge region of the door 5. The door inner part 20 is preferably made in one piece as a light metal cast part and has a number of frame legs, of which an upright frame leg 22 runs adjacent to the A pillar 12, a further upright frame leg 23 runs adjacent to the B pillar 14 and a non-illustrated lower frame leg runs adjacent and parallel to a lateral sill 24 (see FIG. 1). Furthermore, a non-illustrated upper frame leg connecting the two upright frame legs 22 and 23 can also be provided, which runs parallel to and below the waist 6, so that the door inner part 20 can also be described as a peripheral frame.

Each of the fastening brackets 16 and 17 is made in the form of a light metal cast part and is preferably produced in one piece with the door part 18, or the door inner part 20. The front fastening bracket 16 is connected via a base portion 25 to the door inner part 20. The rear fastening bracket 17 starts directly, that is without a base part 25, from the door inner part 20. The fastening brackets 16 and 17 have in each case as a common feature a fork-shaped seat 26 with a self-supporting upper fork web 27 and a lower self-supporting fork web 28, which webs are interconnected via an internal fork bottom 29. Free ends 30 and 31 of the fork webs 27 and 28 end adjacent to the door outer panel 21. The fork webs 27 and 28 receive the lateral impact beam 10 between them in a virtually play-free manner. In this connection, inner surfaces 32 and 33 of the fork-shaped seat 26 configured on the fork webs 27 and 28 are aligned in such a way that the fork-shaped seat 26—starting from the fork bottom 29—widens in the direction toward the door outer panel 21, that is in a direction 34 pointing away from the fork bottom 29. The inner surfaces 32 and 33, which lie opposite one another with a spacing AB, are in the form of unfinished cast surfaces. As the fork-shaped seat 26 widens in the direction of the door outer panel 21, the spacing AB—starting from the fork bottom 29—increases preferably constantly or continuously in the direction of the free ends 30 and 31 of the fork webs 27 and 28. Corresponding to the fork-shaped seat 26, the lateral impact beam 10 is trapezoidal in cross section and thus adapted to the widening seat 26. The lateral impact beam 10 is made in the form of a hollow section and has by definition a compression chord 35 and a tension chord 36. The compression chord 35 lies adjacent to the door outer panel 21, and the tension chord 36 lies close to the fork bottom 29. The two chords 35 and 36 are connected via an upper beam wall 37 and a lower beam wall 38. In order for it to be possible to obtain the trapezoidal cross section, a height HO of the tension chord 36 is smaller than the height HO of the compression chord 35, and the beam walls 37 and 38 run parallel to the inner surfaces 32 and 33 of the fork-shaped seat 26. The lateral impact beam 10 is preferably held inside the seat 26 between the inner surfaces 32 and 33 in a play-free manner. Close tolerances can be provided between the seat 26 and the lateral impact beam 10 for this purpose. It is also possible, however, for the fork-shaped seat 26 to be clamped together lightly via a holding bolt 39 which passes through the seat 26 and the lateral impact beam 10, that is the lateral impact beam 10 is held between the fork webs 27 and 28. The holding bolt 39 is preferably made in the form of a screw with a screw head 40 and a screw shank 41. The screw shank 41 passes through one of the fork webs 26 or 27 freely and is fixed in the other fork web 28 or 27, via a thread for example. In the illustrative embodiment, the lower fork web 28 has a thread into which the screw shank 41 is screwed. The upper fork web 27 is extended through freely by the screw shank 41. In the illustrative embodiment shown, one of the two fork webs is furthermore made with a material thickness MS which is smaller than the material thickness MS of the other fork web. The upper fork web 27 is preferably provided with a smaller material thickness MS than the lower fork web 28. It is thus possible in an easy way to clamp the upper fork web in the direction of the lateral impact beam 10 when the holding bolt 39 is tightened, by virtue of which its play-free holding inside the seat 26 can be favored. The material thickness MS of the lower fork web 28 allows the thread configured therein to have sufficient length for the holding bolt 39 to be fixed securely.

Figure 4:
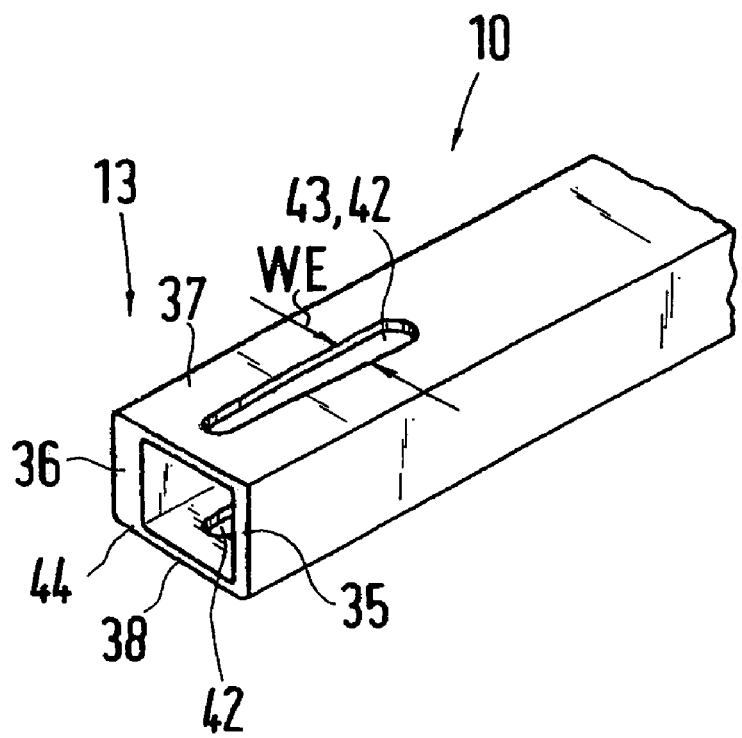
FIGS. 4 and 5 are perspective views of different embodiments of a lateral impact beam.
Figure 5:
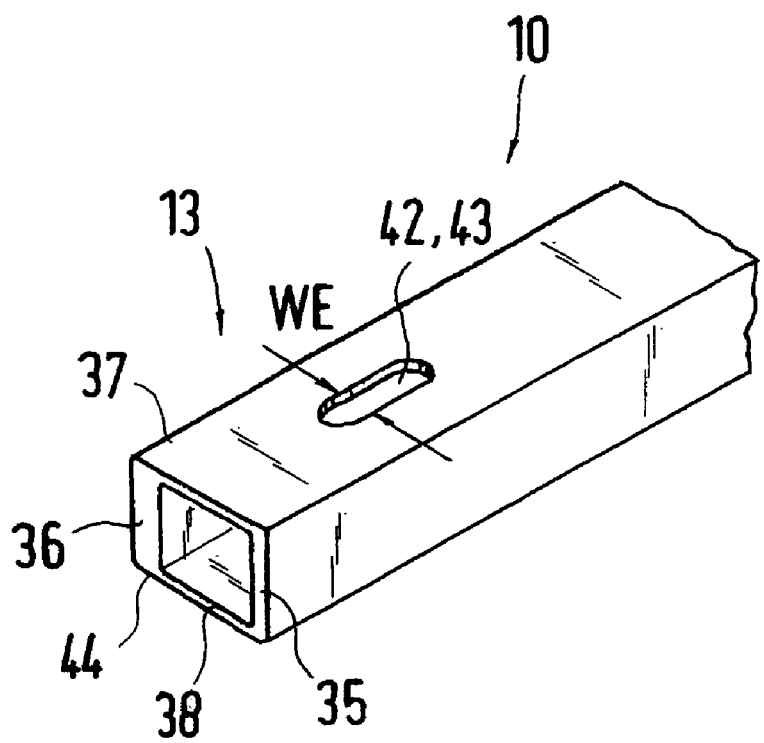

FIGS. 4 and 5 each show an illustrative embodiment of the lateral impact beam 10. Parts which are the same or function in the same way as in the other figures are provided with the same reference signs. FIGS. 4 and 5 illustrate only the front end portion 13 of the lateral impact beam 10. An opening 42, which is in the form of a slot 43 running in the vehicle longitudinal direction FL, is made in the front end portion 13, in both the upper and the lower beam wall 37 and 38. The two illustrative embodiments shown in FIGS. 4 and 5 differ in that the width WE of the slot 43 in FIG. 4 decreases in the direction of an end 44 of the lateral impact beam 10. In the lateral impact beam 10 according to FIG. 5, on the other hand, the slot 43 has a constant width WE.

Moreover, the slot 43 in the illustrative embodiment shown in FIG. 5 has a smaller length, which is measured parallel to the vehicle longitudinal axis FL. The function of such slots, which are extended through by the holding bolt 39, is described in German patent DE 103 20 971 B3 mentioned in the introduction, and this is therefore not discussed further here. It consequently remains to emphasize the special configuration of the slot 43 in FIG. 4, the width WE of which decreases in its longitudinal direction parallel to the vehicle longitudinal axis FL. In this connection, provision is made in particular that the width WE is at least in sections selected to be smaller than the diameter DU of the holding bolt 39.

We claim:

1. A motor vehicle door, comprising:
   a door part; and
   a lateral impact protection device having a lateral impact beam and a fastening device for connecting said lateral impact beam to said door part, said fastening device having at least one fastening bracket being a cast part and connected to said door part, said fastening bracket having a fork-shaped seat for receiving said lateral impact beam, said lateral impact protection device further having a holding bolt passing through said lateral impact beam and said fork-shaped seat, said fork-shaped seat having at least two inner surfaces facing said lateral impact beam and lying opposite one another with a spacing and a fork bottom, said spacing between said inner surfaces increases in a direction pointing away from said fork bottom defining a widening seat, said inner surfaces being unfinished cast surfaces, and said lateral impact beam having a trapezoidal cross section adapted to said widening seat.

2. The motor vehicle door according to claim 1, wherein said lateral impact beam is held inside said fork-shaped seat in a substantially play-free manner in relation to said inner surfaces.

3. The motor vehicle door according to claim 1, wherein said fork-shaped seat has two self-supporting fork webs, which have said inner surfaces.

4. The motor vehicle door according to claim 3, wherein said two self-supporting fork webs have different material thickness.

5. The motor vehicle door according to claim 4, wherein said holding bolt is fixed in a first of said two self-supporting fork webs having a greater material thickness and only extends freely through a second of said two self-supporting fork webs.

6. The motor vehicle door according to claim 1, wherein said fastening bracket and said door part are made as a one-piece part being a light metal cast part and defining a door inner part.

7. The motor vehicle door according to claim 3, wherein said door part includes a door inner part and an outer panel, and said two self-supporting fork webs lie with their free ends adjacent to said outer panel.

* * * * *